March 16, 1965  J. O. MATZENAUER  3,173,250
REVERSE FLOW THRUST CHAMBER
Filed May 5, 1960  2 Sheets-Sheet 1
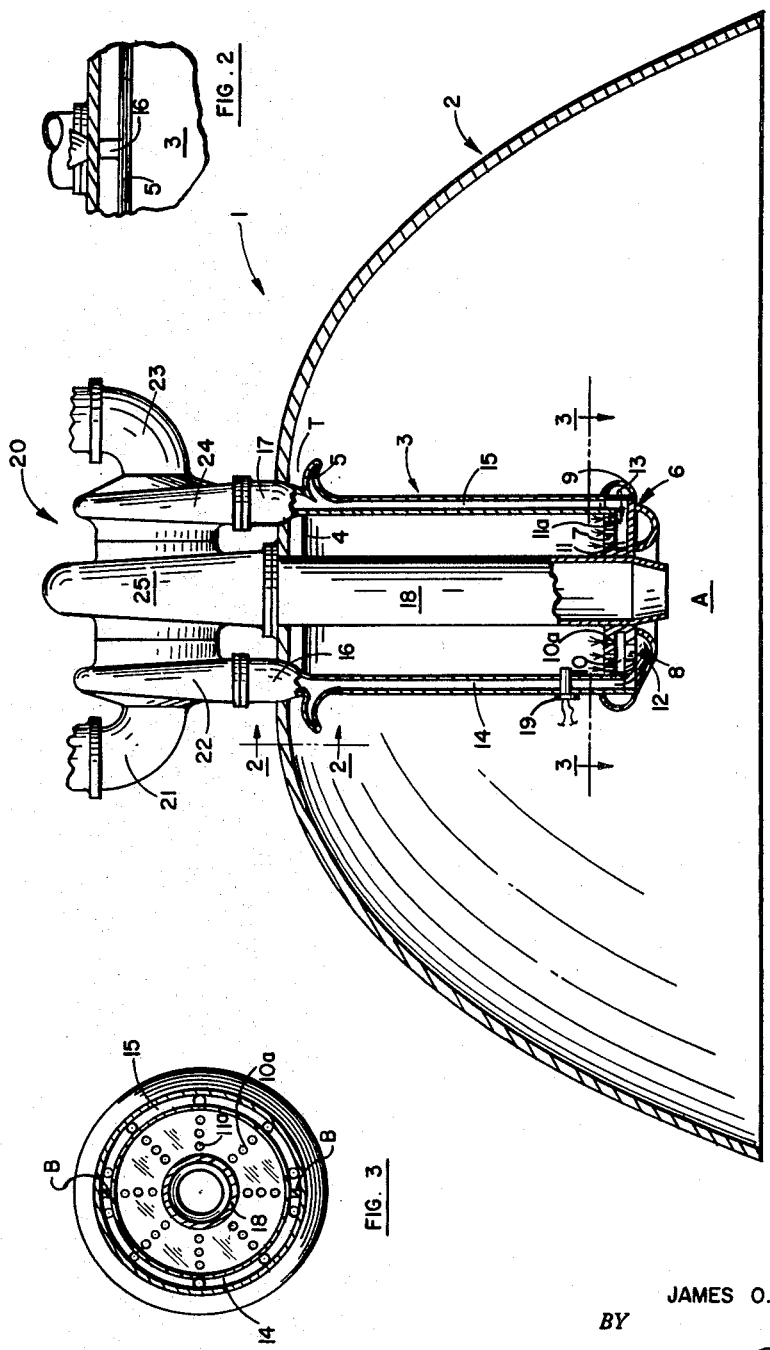
INVENTOR.
JAMES O. MATZENAUER
BY
AGENT

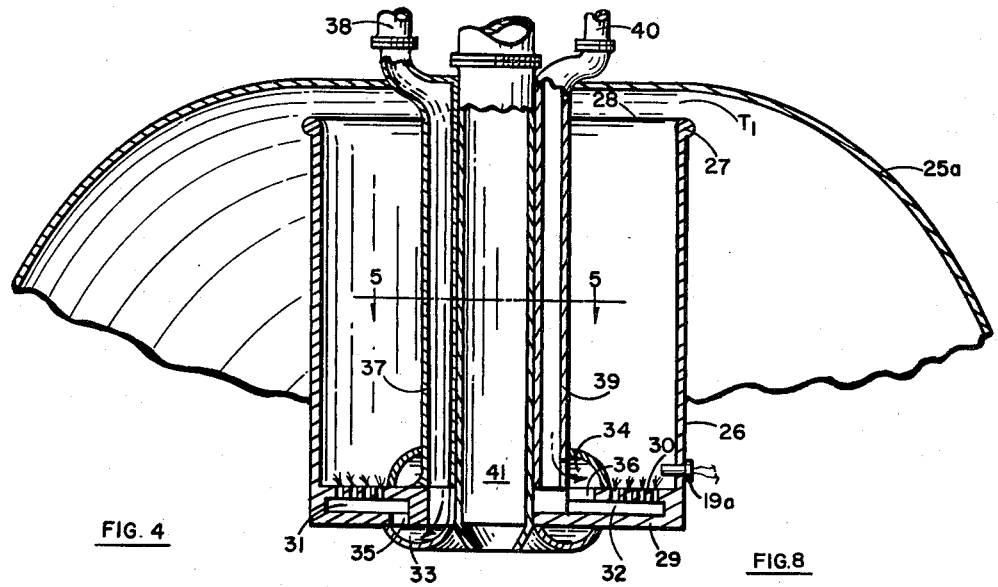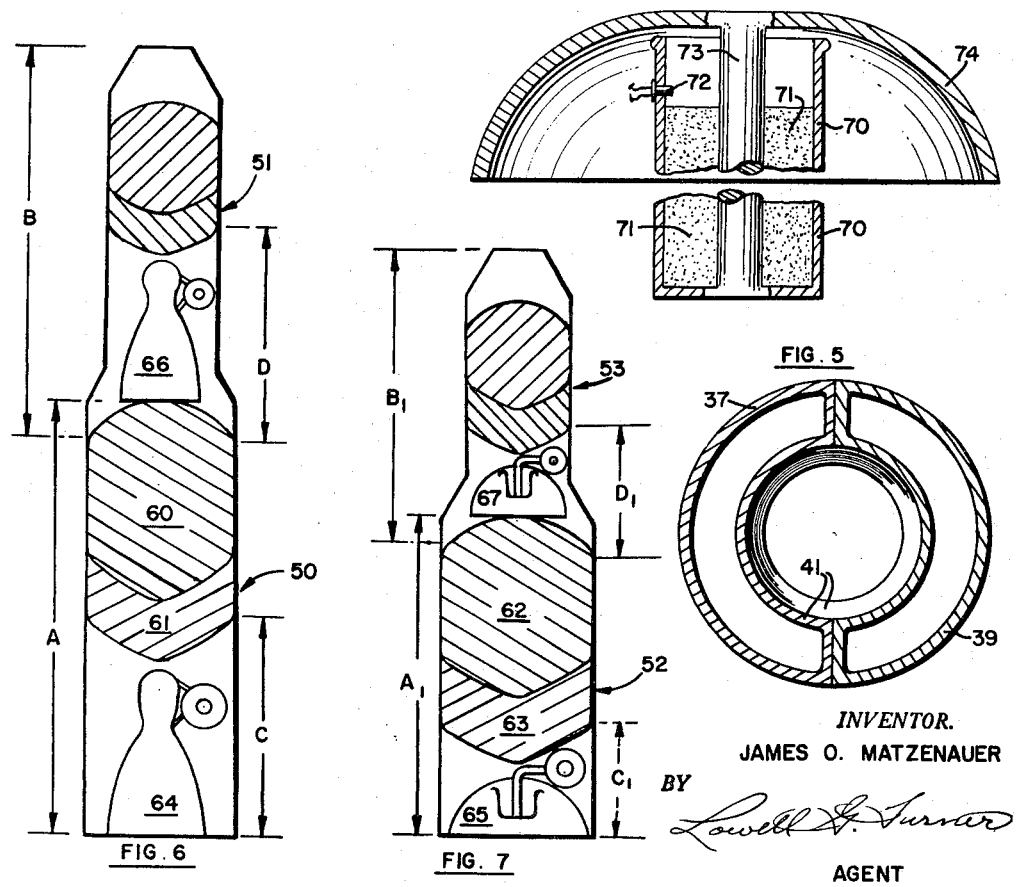

United States Patent Office 3,173,250
Patented Mar. 16, 1965

3,173,250
REVERSE FLOW THRUST CHAMBER
James O. Matzenauer, Woodland Hills, Calif., assignor to North American Aviation, Inc.
Filed May 5, 1960, Ser. No. 27,126
7 Claims. (Cl. 60—35.6)

This invention relates to a new concept in thrust chambers, and more particularly to a thrust chamber wherein the ratio of thrust rating to structural length is relatively high.

The thrust chamber configuration herein described is primarily useful in rocket engine applications and will, therefore, be discussed from this basic aspect. However, it is to be understood that discussions so directed are not to be taken as a limiting factor in the adaptability of the thrust chamber concept to other applications.

Rocket engine thrust chambers of the prior art have generally been constructed to include a cylindrical combustion chamber having an open end, a constricted throat being provided at the open end of the combustion chamber, and a nozzle depending from the throat section structure in either a conical or a bell-shaped section. Such a thrust chamber is utilized by mixing and igniting or decomposing exothermally liquid propellants, or igniting solid propellants disposed therein for the production of large quantities of hot combustion or decomposition products. These combustion products are compressed to high pressure, passed through the constricted throat, expanded and accelerated to supersonic speeds within the nozzle, and exhausted. The resulting reaction forces applied to the thrust chamber supply the propulsion force for powering the vehicle to which the chamber is adapted. This type of thrust chamber is referred to herein as a conventional thrust chamber. In chambers of this general configuration, thrust is produced primarily over the combustion chamber area, only approximately 20 to 30 percent of the total thrust being produced upon the diverging nozzle walls. Even though such thrust chambers are optimized in their thrust-to-total length ratio, their lengths are considerably greater than generally desired for application to the missile industry.

Thrust chamber lengths have been materially reduced through the application of the nozzle commonly referred to as a spike nozzle and by the recently developed nozzle referred to as an expansion-deflection nozzle. A spike nozzle is one having an annular combustion chamber and nozzle walls curving symmetrically from the combustion chamber to converge at a remote point upon the thrust chamber axis. The basic expansion-deflection thrust chamber includes a combustion chamber mounted externally of the nozzle portion in a manner similar to that of the above described conventional thrust chambers. The nozzle extends essentially radially outward from an open end of the combustion chambers, the conventional throat being absent. A deflection plate or disc adapted for turning combustion gases radially outward along the nozzle walls upon their exit from the combustion chamber is positioned within the nozzle adjacently spaced from the combustion chamber open end so as to define an annular throat with the nozzle wall. This thrust chamber construction is more specifically described in a co-pending patent application entitled, "An Expansion-Deflection Thrust Chamber," by D. W. Hege et al., Serial No. 27,128, filed May 5, 1960. The spike nozzle and expansion-deflection nozzles have each succeeded in reducing the length of rocket engine nozzles to approximately one-half that of conventional chambers. However, still further overall engine length reduction is a goal desirable of attainment.

The spike nozzle, while shorter in length for a given thrust rating than conventional nozzles, inherently requires the incorporation of a large diameter annular combustion chamber, the mean diameter of the combustion chamber being greater than the maximum diameter of the conveying nozzle. This introduces structural and heat flow problems of extreme complexity and very difficult solution.

Conventional thrust chambers must necessarily be designed to function with optimum performance at a particular altitude. For most vehicles which traverse a range of altitudes from sea level to high altitude or even outer space vacuum conditions, a compromise or intermediate design altitude is necessarily chosen, with performance above and below this point being obtained at less than optimum efficiency. A conventional nozzle so designed for some compromise design altitude is said to be "overexpanded" when operating at sea level conditions, resulting in an adverse pressure distribution on the nozzle walls which results, in turn, in loss of efficiency or thrust as compared to that at design altitude. Such a conventional nozzle will have too large a ratio of exit area to throat area and, when operating at sea level, acts to expand the exhaust gases to a pressure which is below the atmospheric sea level pressure into which the gases are exhausted. As vehicle altitude is attained during flight, the ambient atmospheric pressure surrounding the nozzle is continually reduced until, at design altitude, the pressure within the exhaust gases at the nozzle exit exactly equals those outside the nozzle. At this point of internal-external pressures balance or equality, the nozzle is at design altitude and is said to be optimally expanded or operating at optimum efficiency conditions. Above the design altitude, the ambient pressure conditions are lower in value than the exhaust gas pressure just within the nozzle exit so that a sudden additional expansion of the gases must occur just after leaving the nozzle exit. The nozzle is then considered to be "under-expanded" and again is not operating at peak efficiency, although the losses thus obtained are generally less severe, relatively, than those obtained when over-expanded or operating below design altitude.

The thrust chamber of this invention, as well as the before-mentioned expansion-deflection thrust chamber, has the fundamental characteristic of operating at all altitudes with performance closer to that obtained at optimum altitude conditions than is true of the conventional type nozzle. Thus, the present thrust chamber will provide greater performance efficiency by producing more efficient exhaust gas expansion, particularly over a wide range of operating altitudes than will conventional thrust chambers. When required to meet proposed operational conditions, the present thrust chamber may be designed with a very high exit-to-throat area ratio, which is efficient at very high altitudes, and it will not suffer severe losses in efficiency when operating at low altitudes as does a comparable conventional thrust chamber.

With these considerations and others in mind, it is an object of this invention to provide a new and improved thrust chamber wherein the total useful thrust is produced upon the nozzle wall.

Another object is to provide a thrust chamber having a high thrust coefficient regardless of altitudes through which it operates.

Still another object is to provide a thrust chamber shorter in total length than any heretofore known thrust chambers of comparable thrust capacity.

A still further object is to provide a thrust chamber wherein the combustion chamber is positioned internally of the nozzle walls.

Yet another object is to economically utilize otherwise non-productive space internally of a rocket engine thrust chamber nozzle.

Another object is to provide a thrust chamber particularly adapatable to powerplants for upper stage vehicles and which is capable of a high degree of stability and control.

Other objects of invention will become apparent from the following description taken in connection with the accompanying drawings, in which:

FIG. 1 is a sectional elevation of the basic thrust chamber of this invention;

FIG. 2 is a fragmentary view of a portion of the FIG. 1 thrust chamber taken along line 2—2;

FIG. 3 is a section of the injector taken along line 3—3 of FIG. 1;

FIG. 4 is a sectional elevation of an alternative embodiment of the invention;

FIG. 5 is a section taken along line 5—5 of FIG. 4;

FIG. 6 is a schematic elevation of a two-stage missile incorporating conventional rocket engines in the various stages;

FIG. 7 is a schematic elevation of a two-stage missile incorporating rocket engines utilizing the present invention; and FIG. 8 is an elevation in partial section showing a solid propellant embodiment of the invention.

The objects of invention are met through the provision of a thrust chamber comprising a nozzle of generally "umbrella" shape and a combustion chamber structure positioned internally of the nozzle. The combustion chamber opens toward a central portion of the nozzle and opposite to the nozzle opening direction and is adjacently spaced from the nozzle walls, an annular throat being defined between the chamber open end and the nozzle so as to require redirection by the throat and by the nozzle walls of combustion gases evolved in the combustion chamber to an ultimate direction substantially reversed from their direction at the time of their production.

The thrust chamber of this invention is similar to the above referenced chamber designated as an expansion-deflection type thrust chamber in that the flow of combustion products approximately radially through the throat, and the subsequent redirection to a more nearly axial direction, is common to both thrust chambers. Thus, the broad operating principle is the same in each instance. Indeed, the present invention may be said to be one of a family of expansion-deflection type thrust chambers. However, the construction of the present thrust chamber differs considerably from that of the referenced expansion-deflection thrust chamber and material improvements thereover are encompassed. While the basic expansion-deflection chamber includes a combustion chamber positioned externally of the nozzle and a centrally-mounted plug located internally of the combustion chamber open end so as to define a throat between the plug and the nozzle wall, the present invention inverts the combustion chamber to provide for its location internally of the nozzle. Hence, the combustion chamber is located in a position opposite that of the basic expansion-deflection thrust chamber, the structure inherent in the design, eliminating the need for a separate plug for initially directing gas flow.

While the present nozzle portion of the invention may be quite similar or identical to that of the basic expansion-deflection nozzle, space required for structure is herein utilized in a vastly more efficient manner, the total thrust chamber length being reduced by the length of the combustion chamber. This is accomplished without the necessity of sacrificing space in other respects since the interior space utilized for combustion chamber positioning is an otherwise dormant region within the nozzle proper.

As illustrated in FIGS. 1–3, the overall thrust chamber, along with a turbopump assembly for propellant feed attached to its upper extremity, is indicated by the numeral 1 and is sometimes referred to as a rocket engine. The thrust chamber proper is generally comprised of a nozzle 2 and a combustion chamber 3 structurally supported internally of nozzle 2.

Nozzle 2 is shown in FIG. 1 as being of modified oval shape. This particular shape is intended to be representative only, the specific shape to be utilized in particular applications being variable to meet particular design considerations. The nozzle, in its broad aspects, is sometimes referred to as umbrella-shaped for purpose of discussion. It is illustrated in FIG. 1 as being constructed of a solid metallic material. However, this construction may be varied to include materials conventionally known in the field of rocketry as being high temperature resistant, of the ablating variety or high temperature resistant linings upon walls of otherwise conventional materials. Sprayable coatings such as aluminum oxide or ceramic are usable for this purpose, as are also insulating materials comprised of impregnated rubber. Graphite has also been found to be an acceptable liner for rocket engine nozzles. It will also be apparent to those having knowledge of the rocket engine thrust chamber art that the walls of either the nozzle or the combustion chamber may be regeneratively cooled by constructing those elements of a series of juxtaposed and mutually sealed tubes so as to pass either or both of the liquid propellants through one tube, into a manifold provided for the purpose at the tube extremities and back through the next adjacent tube before introducing that propellant into the injector area. Although such construction is not specifically illustrated, it is within the skill of the art and may be employed in constructing the present thrust chambers without departing from the inventive concept thereof.

The structure of combustion chamber 3, which may be referred to as being cup-shaped, includes an open end 4 positioned adjacent to and spaced from a central portion of nozzle 2. Open end 4 sometimes includes a generally radially directed flange 5 attached thereto. A substantially closed end 6 of combustion chamber 3 includes an injector 7 and a pair of manifolds 8 and 9 interconnected to regions known in the art as "doghouses" 10 and 11 via passages 12 and 13, respectively. The walls of combustion chamber 3 intermediate of ends 4 and 6 are hollow to provide passageways 14 and 15 communicating to manifolds 8 and 9 from propellant feed lines 16 and 17, respectively. The separation of these passageways is representatively illustrated in FIG. 3, bulkheads B serving as separators for the propellants. Lines 16 and 17 are structurally welded or otherwise attached to nozzle 2, the interior of those lines being interconnected to passages 14 and 15 in the walls of combustion chamber 3 by means of weldments or other structural attachments at combustion chamber open end 4.

Primary support for combustion chamber 3 is provided by conduit 18 axially affixed through nozzle 2 and through combustion chamber closed end 6. Conduit 18 also serves a second function, that of transmitting turbine drive gases from the turbopump to the interior of the nozzle. The gases are exhausted into low pressure area A at the base of combustion chamber 3.

A conventionally known turbopump is indicated as 20. It includes a line 21 leading from a propellant storage tank (not shown) into a propellant pump 22 and a line 23 leading from a second storage tank (not shown) to a propellant pump 24. Pumps 22 and 24 are shaft-connected and driven by a common turbine within the housing indicated as 25. Gases bled from the combustion chamber, or produced by any one of a series of gas generators (not shown) known in the art, are ducted to the turbine housing 25. Gases are generated by the gas generator and passed through the turbine for driving the pumps. After being used to drive the turbine, the gases are collected within housing or volute 25 and directed into conduit 18 from whence they are disposed of into area A in an efficient manner and which precludes interference of these turbine exhaust gases with missile structure, a problem with conventional engines.

Whether the turbopump arrangement illustrated is utilized in a specific rocket engine is a matter of design which is not intended to limit the scope of the present invention. Where desirable, a pressure fed system may be substituted for the turbopump arrangement, in which case lines 16 and 17 lead directly from the pressurized propellant tanks and conduit 18 serves only as a structural member having no secondary utility as a turbine exhaust conduit as in FIG. 1.

The annular space designated by letter T and defined between open end 4 and nozzle 2 is the thrust chamber throat region through which combustion gases exiting from combustion chamber 3 are expanded into nozzle 2.

Operationally, liquid propellant rocket engine 1 functions through the mixing and combustion of liquid oxidizer and fuel components for the ultimate production of useful thrust. Assuming that oxidizer is pump-fed to line 16 and fuel is pump-fed to line 17, the oxidizer is passed from feed line 16 into passage 14, cooling the combustion chamber walls. It is then passed into manifold 8, through passages 12, into doghouses 10 and is injected into combustion chamber 3 through injector ports 10a. The fuel is passed from feed line 17 into passages 15 to cool the walls of combustion chamber 3 and then into manifold 9 from which position the fuel is passed into doghouses 11 through passages 13 and injected into combustion chamber 3 through injector ports 11a, (see FIG. 3). The oxidizer and fuel are mixed within the combustion chamber and ignited by conventional igniter means 19 or by the hypergolic characteristics of the propellants. They are combusted for the production of great quantities of high temperature pressurized gases. These gases are compressed further and passed essentially radially outward through throat T. They are then expanded around flange 5, further expanded within nozzle 2 proper and redirected by the nozzle walls into a more nearly axial direction.

Alternatively, a single propellant can be decomposed thermally or by catalytic means and utilized in such a thrust chamber, in which case only one propellant may be involved rather than the two generally described.

It is many times desirable that support members between the nozzle and the combustion chamber open end be eliminated. The configuration of FIG. 4 eliminates such supports and utilizes propellant transmittal lines in an alternative location to that shown in FIG. 1. In FIG. 4, nozzle 25a is constructed in essentially the same manner as is nozzle 2 in the FIG. 1 embodiment. However, the structure of combustion chamber 26 is varied. It is illustrated here as being of solid wall construction, although this wall, too, might be regeneratively cooled by the application of tubular or double wall chamber construction and the passage of one or more propellants internally therethrough. A bead or shoulder member 27 is included in open end 28 of the combustion chamber to assist in providing a throat and in initial expansion of gases, a throat $T_1$ being defined between nozzle 25a and shoulder 27. A combustion chamber closed end 29 includes an injector 30 having a plurality of oxidizer doghouses 31 and a plurality of fuel doghouses 32 communicating with manifolds 33 and 34 through passages 35 and 36, respectively. Oxidizer manifold 33 is connected to oxidizer conduit 37 which leads from supply line 38, and fuel manifold 34 is interconnected to fuel conduit 39 which leads from supply line 40, (see arrows). Conduits 37 and 39 are more specifically illustrated in FIG. 5. These conduits may serve with turbine exhaust conduit 41 as structural support members to maintain the relative position of combustion chamber 26 with respect to nozzle 25a. In the event a pressurized propellant system is used rather than a turbopump fed system, wherein a turbine exhaust is necessary, conduit 41 may be eliminated and conduits 37 and 39 redesigned to serve as both the propellant conduits and as the primary structural supports for the combustion chamber without departing from the intended scope of the present invention. A conventional igniter 19a for igniting the mixed propellants is representatively illustrated.

Functionally, the rocket engine of FIG. 4 operates in essentially the same manner as does the engine of FIG. 1. The propellants are introduced into the injector doghouses through interconnected manifolds and feed lines and injected into the combustion chamber where they are mixed, ignited, and combusted in a conventional manner. The generated gases are then passed essentially radially outward through throat $T_1$, expanded around shoulder 27, further expanded within nozzle 25a and redirected by the nozzle walls into a more nearly axial direction, the ultimate direction depending upon the design characteristics of the particular nozzle incorporated in the rocket engine.

FIGS. 6 and 7 illustrate utility of the present thrust chamber in conserving space when adapted as a missile propulsion unit. FIG. 6 shows a first stage missile 50 of length A and a second stage missile 51 of length B mounted upon the first stage. Similarly, FIG. 7 includes a first stage missile 52 of length $A_1$ and a second stage missile 53 of length $B_1$. Missile 50 includes a fuel tank 60 and an oxidizer tank 61 identical in size to fuel tank 62 and oxidizer tank 63 of missile 52. However, missile 50 incorporates a conventional rocket engine 64 which necessitates a skirt or so-called "boattail" of a length indicated as C. Missile 52 incorporates a rocket engine including a thrust chamber designed in accordance with the principles of the present invention. Engines 64 and 65 are of equal thrust rating. It is important to note that skirt length $C_1$, required to surround rocket engine 65, approximates only about one-half that of skirt C, required to surround the conventional engine. Thus, the total length and, therefore, the total weight of missile 52 is substantially reduced over the length and weight of missile 50.

A similar result is achieved in the second stage missiles through the application of a rocket engine including the present invention. Missile 51 incorporates a conventional rocket engine 66 and missile 53 incorporates a rocket engine 67 of equal thrust rating. Again, the skirt length D of missile 51 is approximately twice that required for $D_1$ of missile 53.

The importance of this structural length reduction in the missile industry can be better appreciated in light of representative figures of the resulting weight reduction. The figure of eight pounds per inch of structural length is a figure which has been expresesd as fairly representative of weight reduction in the skirt region of a one-stage or first stage of a multi-stage missile of about eight feet diameter. The reduction in length of a missile skirt from an assumed length of ten feet to a length of five feet would, in the representative case, reduce the total flyable missile weight by 480 pounds. This weight reduction is in addition to direct reductions in engine structural weights.

Interstage structure, as also represented by dimensions D and $D_1$ in FIGS. 6 and 7 are of even greater importance from the structural weight standpoint than are those of similar first stage or one stage dimensions. This structure bridges between the successive stage of the missile, carrying all the weight of components located above the lower stage. This structural loading is magnified by "G" loads developed during missile flight. Additionally, high aerodynamic forces applied to both the skirt and the overall interstage structure during missile flight through the atmosphere are encountered and high bending loads are introduced into the missile which must be resisted by the interstage structure during flight. Not only are the "G" loads more difficult to resist as missile lengths increase, but bending loads are actually magnified with length. Thus, the saving in missile length and particularly in interstage structure, is vitally important in minimizing overall missile weight. Were more than two stages utilized in a single missile assembly, the relative savings in missile structure weight would be even greater. The compact nature of the present thrust chamber also has other subtle advantages in making the assembly to which it is adapted more readily accessible for installation and maintenance procedures and in making it more competitive to the apparently simple structure of solid propellant nozzles.

It is readily apparent that the described reductions in engine and missile weight devolving from the reduction in length of the present invention over its predecessor thrust chambers greatly enhances missile capabilities when the thrust chamber is so applied, particularly since performance is not adversely affected but improved in most respects. Among other benefits, lenth and weight reductions provide greater range through the ability to carry more propellant, increased payload carrying ability, and increased missile structural integrity.

The present invention is equally as applicable to solid propellant thrust chambers as to liquid propellant units. FIG. 8 illustrates a typical solid propellant embodiment constructed in basically the same manner as the liquid propellant embodiment of FIG. 4. Combustion chamber 70 has disposed therein a combustible solid propellant 71 ignitable by igniter means 72. As representatively illustrated, support means 73 corresponding to member 41 maintains the relative positions of the combustion chamber and the nozzle, the nozzle being adjacently spaced from and disposed over the combustion chamber open end as in FIG. 4.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A thrust chamber comprising wall means forming a combustion chamber having an open end and a closed base portion, an umbrella-shaped nozzle having an open flared end inverted over said combustion chamber and extending beyond said base portion, a structural support member attached approximately centrally of said closed base portion and axially extending through said combustion chamber, said nozzle being attached to said structural support at an end opposite said closed base portion, a central portion of said nozzle retained in a spaced relation from said combustion chamber open end forming a radial throat section therewith whereby combustion products exiting from said combustion chamber are expanded sonically accelerated and directed generally outward between the open end of said combustion chamber and said nozzle central section, said nozzle having an outwardly curved portion for axially deflecting and exhausting said products from said nozzle open end.

2. A rocket engine thrust chamber comprising a hollow structural element enclosing an annular combustion chamber, said combustion chamber including an open end, a closed end, and a substantially radially extending flange peripherally attached about said open end, a structural support member attached approximately centrally of said closed end and axially extending through said combustion chamber, a nozzle attached to said structural support opposite said combustion chamber closed end, said nozzle positioned in a spaced relation from said flange to form a radially outwardly extending restricted throat section therewith, said section being sized to expand and sonically accelerate combustion products from said combustion chamber, said nozzle being curved circumferentially over said combustion chamber to enclose at least a portion of said combustion chamber, injector means upon said combustion chamber for injecting liquid propellant into said combustion chamber, passage means communicating between the exterior of said nozzle and said injector means, means for supplying pressurized liquid propellant to said injector means through said passage means, and an igniter for initiating combustion of propellants injected into said combustion chamber.

3. A reverse flow thrust chamber comprising a hollow structural member enclosing a combustion chamber and including an open end and a closed end, an outwardly extending annular flange fixed to said open end, an inner surface of said member being faired smoothly into a contoured outer surface of said flange, a tubular member fixed to said closed end and supporting said hollow structural member, a generally umbrella-shaped nozzle fixed to an end of said tubular member opposite said closed end of said hollow structural member, said nozzle extending in a curved contour over said closed end of said hollow structural member into a more nearly axial direction, an open end of said nozzle opening in a direction substantially opposite the opening of said hollow structural member, said tubular member including a passage extending through said closed end and said nozzle, said flange and a portion of said nozzle being adjacently spaced and defining an annular throat therebetween for the exit from said combustion chamber and the passage through said throat of combustion gases in a substantially radial direction, turbopump means mounted upon and externally of said nozzle for pumping propellants into said combustion chamber adjacent said closed end, said turbopump means being adapted to exhaust gas into said nozzle, and means for igniting said pumped propellants, whereby exhaust gases from said turbopump means exhaust through said passage into said nozzle and combustion products exiting from said throat are deflected by said nozzle, expanded therein and exhausted from said nozzle opening for the production of useful thrust.

4. A rocket engine thrust chamber comprising means defining an open ended combustion chamber, structural support means attached to and extending from said chamber, a nozzle fixed to said structural support means, said structural support means being a tubular member adapted for accepting turbine exhaust products from a turbine and passing said products into said nozzle approximately centrally of said nozzle, said nozzle including a central portion positioned in an adjacent spaced relation from said combustion chamber open end, a skirt portion of said nozzle depending from said central portion so as to circumferentially surround said combustion chamber, an open end of said skirt directed substantially opposite combustion chamber open end, and a turbine driven propellant pump provided externally of said nozzle for supplying propellants under pressure to said combustion chamber.

5. A rocket engine thrust chamber comprising a hollow structural element enclosing a combustion chamber and including an open end, a closed end, and a substantially radially extending flange peripherally attached about said open end, a structural support member attached approximately centrally of said closed end and axially extending through said combustion chamber, a nozzle attached to said structural support opposite said combustion chamber closed end, said structural support being adapted to accept and discharge exhaust gases from a gas producing device directly into said nozzle, said nozzle positioned in a spaced relation from said flange and being curved circumferentially over said combustion chamber to enclose at least a portion of said combustion chamber, injector means upon said combustion chamber for injecting liquid propellant into said combustion chamber, passage means communicating between the exterior of said nozzle and said injector means, a centrifugal, propellant pump driven by a turbine connected to said passage means, said turbine adapted to be driven by combustion gases and said pump adapted to supply pressurized liquid propellant to said injector means through said passages, and an igniter for initiating combustion of propellants injected into said combustion chamber.

6. A liquid propellant rocket engine thrust chamber comprising a hollow structural element enclosing a combustion chamber, said combustion chamber including an open end, a closed end containing injection means to inject propellant into the combustion chamber, and a substantially radially extending flange peripherally attached to a combustion chamber side wall about said open end, a structural support member attached approximately centrally of said closed end and axially extending through said combustion chamber, a nozzle attached to said structural support at an end opposite said combustion chamber closed end, said nozzle positioned in a spaced relation from said flange to form a radially outward extending restricted throat section therewith, said section being sized to expand and sonically accelerate combustion products from said combustion chamber, said nozzle being curved circumferentially over said combustion chamber to enclose at least a portion of said combustion chamber and to direct said combustion products in a direction substantially parallel to said support member.

7. The invention as set out in claim 6 in which said support member is hollow and conducts turbine exhaust gases rearwardly from a turbine supplying propellants to said injection means, and wherein said propellants regeneratively cool said flange and at least one wall of said combustion chamber.

References Cited in the file of this patent

UNITED STATES PATENTS

| | | |
|---|---|---|
| 1,879,579 | Stolfa et al. | Sept. 27, 1932 |
| 2,406,560 | Pope | Aug. 27, 1946 |
| 2,412,134 | Eksergian | Dec. 3, 1946 |

FOREIGN PATENTS

| | | |
|---|---|---|
| 1,734 | Great Britain | Apr. 24, 1876 |
| 126,325 | Great Britain | May 15, 1919 |
| 157,231 | Switzerland | Dec. 1, 1932 |
| 312,247 | Switzerland | Feb. 29, 1956 |
| 729,133 | Germany | Dec. 10, 1942 |